(12) United States Patent
Slobodin

(10) Patent No.: US 7,554,623 B2
(45) Date of Patent: Jun. 30, 2009

(54) OPTICAL ASSEMBLY TO PROVIDE COMPLEMENTARY ILLUMINATION OF SUBPIXELS OF A LIGHT VALVE PIXEL

(75) Inventor: David Elliot Slobodin, Lake Oswego, OR (US)

(73) Assignee: Infocus Corporation, Wilsonville, OR (US)

( * ) Notice: Subject to any disclaimer, the term of this patent is extended or adjusted under 35 U.S.C. 154(b) by 539 days.

(21) Appl. No.: 11/060,939

(22) Filed: Feb. 18, 2005

(65) Prior Publication Data

US 2006/0187365 A1    Aug. 24, 2006

(51) Int. Cl.
*G02F 1/1335*    (2006.01)
(52) U.S. Cl. .......................... 349/57; 349/67
(58) Field of Classification Search ................ 349/57, 349/5, 95, 69, 8, 67
See application file for complete search history.

(56) References Cited

U.S. PATENT DOCUMENTS

| | | | |
|---|---|---|---|
| 4,632,514 A | 12/1986 | Ogawa et al. | |
| 5,085,973 A | 2/1992 | Shimizu et al. | |
| 5,161,042 A | 11/1992 | Hamada | |
| 5,309,188 A * | 5/1994 | Burstyn | 353/33 |
| 5,386,306 A | 1/1995 | Gunjima et al. | |
| 5,398,086 A * | 3/1995 | Nakano et al. | 353/31 |
| 5,621,550 A * | 4/1997 | Oku | 349/5 |
| 5,689,321 A * | 11/1997 | Kochi | 349/143 |
| 5,781,252 A * | 7/1998 | Gale | 349/8 |
| 5,781,257 A * | 7/1998 | Gal et al. | 349/57 |
| 5,801,795 A * | 9/1998 | Ogino | 349/5 |
| 5,852,479 A * | 12/1998 | Ueda et al. | 349/9 |
| 6,064,452 A * | 5/2000 | Ogino | 349/57 |
| 6,072,272 A | 6/2000 | Rumbaugh | |
| 6,104,446 A * | 8/2000 | Blankenbecler et al. | 349/5 |
| 6,147,735 A * | 11/2000 | Yamazaki et al. | 349/117 |
| 6,151,166 A * | 11/2000 | Matsushita et al. | 359/566 |
| 6,312,130 B2 * | 11/2001 | Haba et al. | 353/34 |
| 6,332,684 B1 | 12/2001 | Shibatani et al. | |
| 6,359,719 B1 * | 3/2002 | Ori | 359/242 |
| 6,457,828 B1 | 10/2002 | Hayashi | |
| 6,885,418 B2 | 4/2005 | Matsushita et al. | |
| 7,139,058 B2 | 11/2006 | Son et al. | |
| 7,239,363 B2 | 7/2007 | Park et al. | |
| 7,304,697 B2 * | 12/2007 | You | 349/69 |
| 7,492,379 B2 | 2/2009 | Credelle et al. | |
| 2003/0122998 A1 | 7/2003 | Iijima et al. | |
| 2004/0066471 A1 | 4/2004 | Bierhuizen | |
| 2004/0080479 A1 | 4/2004 | Credelle | |
| 2004/0095528 A1 | 5/2004 | Nakamura et al. | |
| 2004/0108818 A1 | 6/2004 | Cok et al. | |
| 2005/0083453 A1 | 4/2005 | Nakano et al. | |
| 2005/0162600 A1 | 7/2005 | Rho et al. | |
| 2005/0169551 A1 | 8/2005 | Messing et al. | |

(Continued)

OTHER PUBLICATIONS

Harbers et al., "Performance of High-Power LED Illuminators in Projection Displays," Lumileds Lighting, San Jose, CA, USA, date unknown, 4 pgs.

(Continued)

*Primary Examiner*—James A Dudek
(74) *Attorney, Agent, or Firm*—Schwabe Williamson & Wyatt

(57) ABSTRACT

An apparatus, system, and method for an optical assembly providing illumination to subpixels of a pixel in a manner to complement characteristics of the subpixels are disclosed herein.

9 Claims, 4 Drawing Sheets

U.S. PATENT DOCUMENTS

2007/0076144 A1     4/2007    Okita et al.

OTHER PUBLICATIONS

Amendment/Response in U.S. Appl. No. 11/144,921, filed Apr. 13, 2009.
USPTO Office Action in U.S. Appl. No. 11/144,921 mailed Feb. 27, 2009.
Amendment/Response in U.S. Appl. No. 11/144,921, filed Nov. 18, 2008.
USPTO Office Action in U.S. Appl. No. 11/144,921 mailed Aug. 18, 2008.
Amendment/Response in U.S. Appl. No. 11/144,921, filed Apr. 11, 2008.
USPTO Office Action in U.S. Appl. No. 11/144,921 mailed Feb. 26, 2008.
Amendment/Response in U.S. Appl. No. 11/144,921, filed Nov. 20, 2007.
USPTO Office Action in U.S. Appl. No. 11/144,921 mailed Aug. 20, 2007.

* cited by examiner

OPTICAL ASSEMBLY TO PROVIDE COMPLEMENTARY ILLUMINATION OF SUBPIXELS OF A LIGHT VALVE PIXEL

FIELD OF THE INVENTION

Embodiments of the invention relate generally to the field of projection systems, and more particularly to an optical assembly to provide complementary illumination of subpixels of a light valve pixel.

BACKGROUND OF THE INVENTION

Multimedia projection systems have become popular for purposes such as conducting sales demonstrations, business meetings, classroom training, and for use in home theaters. In typical operation, multimedia projection systems receive analog video signals from a video unit and convert the video signals to digital information to control one or more digitally driven light modulators. Depending on the cost, brightness, and image quality goals of the particular projection systems, the light modulators may be of various sizes and resolutions, be transmissive or reflective, and be employed in single or multiple light path configurations.

Many light modulators used in projection and direct viewing systems operate on the basis of polarization. Such light modulators may include reflective or transmissive light valves based on liquid crystal technology. These liquid crystal light valves can produce a high-resolution image by changing the polarization state upon reflection or transmission of incident light. A polarization-analyzing device may then propagate the light from a bright state pixel of the light valve as a display image to be viewed by the human eye or projected onto a viewing screen.

There are several different optical architectures for employing liquid crystal light valves. One variation is a multipath optical architecture that provides a separate path for each of the primary color (red, blue, and green) lights. Polychromatic light is optically divided to provide each of the three pathways with its associated color light. The different color lights are routed through a series of polarization beam splitters, filters, and wave plates to a color-specific light valve. Each of the light valves is controlled with its respective color data in order to manipulate the colored light into image bearing light. The individual pathways are then reconverged into a color image. Although this design produces an acceptable image, the optics required for the color divergence, separate modulation, and reconvergence are expensive and costly to implement.

Another variation is a single-path multimedia projector. This type of projector involves only one light path that is sequentially illuminated with primary colors that time-share the same liquid crystal light valve. One alternative of this architecture employs a light source to produce polychromatic light rays, which are then directed through color filter segments of a color wheel. This filtering out of the nonselected color provides resource waste that could increase power consumption or decrease the brightness of the projected image.

Another alternative of the single-path multimedia projector employs monochromatic solid-state light sources, such as light-emitting diodes, to selectively emit the primary colors. This alternative requires expensive color combining optics in order to make the three color light beams coaxial before illuminating the liquid crystal light valve. Also, because the solid-state light sources are pulsed at 1/3 duty ratio the lumens/watt efficiency drops as the drive current increases.

A promising alternative to the above-mentioned optical architectures involves a microlens array that is optically coupled with the liquid crystal light valve. This microlens array receives the primary colored light along three ranges of incident angles and focuses the primary colors onto separate subpixels of each individual pixel. The subpixels can simultaneously and selectively modulate the individual colors in order to transmit a colored image. The promises of the microlens alternative, however, are tempered by inefficiencies due to light processing characteristics of prior art systems. These inefficiencies may result directly or indirectly from color separation, polarization filtering, and/or underfilling the subpixels.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Illustrative embodiments of the present invention include an optical assembly adapted to provide complementary illumination to subpixels of light valve pixel, and methods practiced thereon.

Various aspects of the illustrative embodiments will be described using terms commonly employed by those skilled in the art to convey the substance of their work to others skilled in the art. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments. In particular, a wide variety of optical components such as prisms, mirrors, lenses, integration elements, etc. may be used as appropriate to fold, bend, or modify the illumination for the intended application. Integration of these optical components into illustrated embodiments may not be specifically addressed unless it is necessary to develop relevant discussion of embodiments of the present invention.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
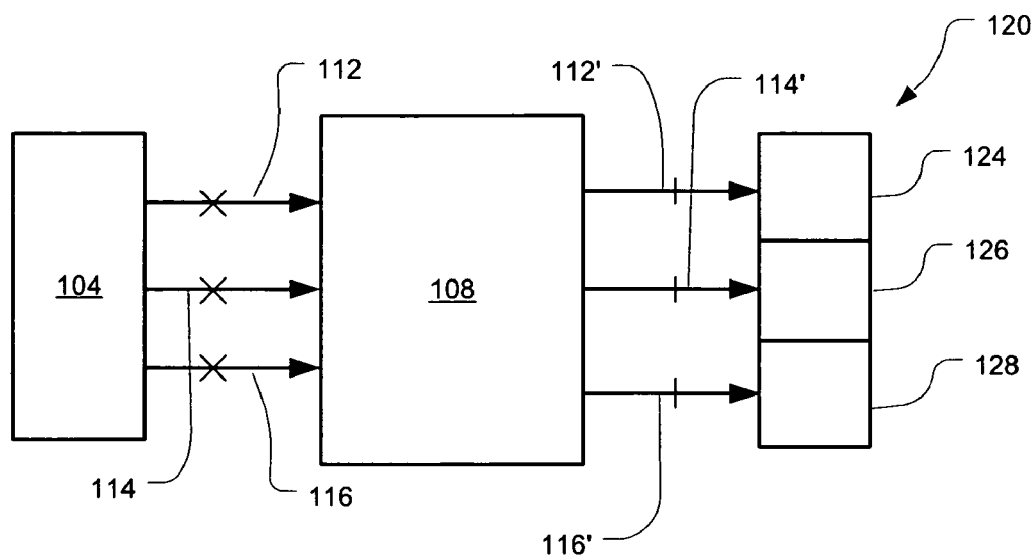
FIG. 1 is a simplified block diagram of an illumination module, optical assembly, and a pixel, in accordance with an embodiment of the present invention.

FIG. 1 illustrates a simple block diagram of an optical architecture 100, in accordance with an embodiment of the present invention. In brief, an illumination module 104 may provide randomly polarized light to an optical assembly 108. Randomly polarized light may be indicated in the figures by Xs in the optical paths. The randomly polarized light may be in the form of colored illumination bundles 112, 114, and 116. Each of the illumination bundles 112, 114, and 116 may include a first and a second polarization state, e.g., a P-polarized portion and a, largely orthogonal, S-polarized portion. The optical assembly 108 may include components adapted to receive the illumination bundles 112, 114, and 116 and transmit, e.g., the P-polarized portions 112', 114', and 116' to a light valve pixel 120. P-polarized light may be indicated in the figures by short transverse lines in the light paths, suggesting a polarization vector in the plane of the drawing sheet.

In one embodiment, the illumination bundles 112, 114, and 116 may each be of a primary color such as red, green, or blue. In this embodiment, the pixel 120 may be a liquid crystal pixel with selectively controlled electrodes designed to spatially address subpixels 124, 126, and 128. The electrodes, and thereby the corresponding subpixels, may be activated with corresponding color data such that the colored illumination bundles 112', 114', and 116' are selectively passed on, in desired portions, as image bearing light. The portions of the illumination bundles 112', 114', and 116' that are passed on as image bearing light may then coalesce into a colored image upon display.

The optical assembly 108 may also include components adapted to process the illumination bundles 112, 114, and 116 so that the transmitted illumination bundles 112', 114', and 116' complement characteristics of the subpixels 124, 126, and 128. In one embodiment, the illumination bundles 112', 114', and 116' may provide complementary illumination by being presented to the subpixels 124, 126, and 128 in a manner to increase the overall light transmission through the respective subpixels 124, 126, and 128. Providing complementary illumination in such a manner to the subpixels may increase the overall brightness, efficiency, and/or contrast of the optical architecture 100.

In one embodiment, the optical architecture 100 may also include a polarizing analyzer behind the pixel 120 (not shown) to filter out stray polarized light, thereby potentially enhancing the contrast of the displayed image. Analyzers and polarizing filters can also be placed in other locations of the optical architecture 100 as may be appropriate for a particular application or illumination module.

In one embodiment the illumination module 104 may include a polychromatic light source such as a gaseous discharge lamp (e.g., high-pressure mercury, tungsten, halogen, or metal halide). In this embodiment, reflective color filters (e.g., a dichroic interference filter) or refractive based color separating devices (e.g., a prism) may be used to separate the light into the desired colors for presentation to the corresponding subpixel. In other embodiments, monochromatic solid-state light sources such as, for example, light-emitting diodes, may be used to produce light of the desired color.

Figure 2:
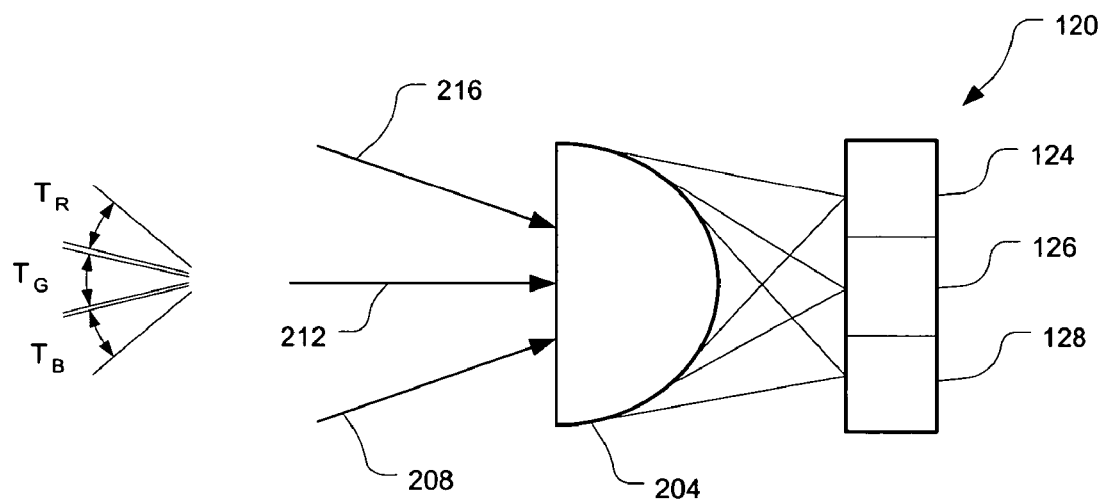
FIG. 2 illustrates a side view of a lens focusing light on subpixels, in accordance with an embodiment of the present invention.

FIG. 2 illustrates a side view of a lens 204 that may be used to present angular color separated (ACS) illumination to the pixel 120. The lens 204, which may be included in the optical assembly 108, may be designed such that illumination that is incident upon the lens 224 within predetermined ranges of incident angles are focused on specific areas of the pixel 120. For example, in one embodiment illumination bundles that have incident angles within a range $\Theta_R$ may be subsequently focused on the subpixel 128; illumination bundles that have incident angles within a range $\Theta_G$ may be subsequently focused on the subpixel 126; and finally, illumination bundles that have incident angles within a range $\Theta_B$ may be subsequently focused on a third subpixel 124. Therefore, in one embodiment red, green, and blue illumination bundles 216, 212, and 208, respectively, may be simultaneously focused on subpixels 128, 126, and 124, respectively, for selective transmission.

Figure 3:
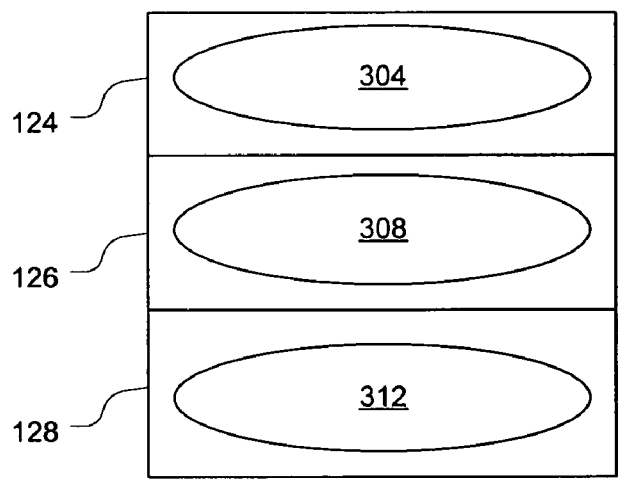
FIG. 3 illustrates the illumination incident upon subpixel apertures, in accordance with an embodiment of the present invention.

In one embodiment, the lens 204 may be adapted to anamorphically illuminate the subpixels 124, 126, and 128 in order to complement characteristics of the subpixels such as the angular transmission distribution and/or the aspect ratio of the subpixels. FIG. 3 illustrates the subpixels 124, 126, and 128 being anamorphically illuminated in accordance with an embodiment of the present invention. In this embodiment, each of the subpixels 124, 126, and 128 may have a rectangular aspect ratio with an elongated dimension in, e.g., the horizontal direction. The incident illumination bundles 208, 212, and 216 may be transmitted through the lens 204 and focused upon the subpixels 124, 126, and 128, respectively, with an elongated axis that complements the rectangular apertures. This may result in elliptical illumination areas 304, 308, and 312 presenting a substantial portion of the illumination to the transmittable region of the respective subpixels.

In one embodiment each of the subpixels 124, 126, and 128 may have similar characteristics. However, in other embodiments the subpixels 124, 126, and 128 may have different characteristics. In one embodiment, different subpixel characteristics may be designed to complement the spectral properties of the light that the particular subpixel is adapted to receive. For example, in one embodiment in order to achieve a desired color balance, more illumination of one color, e.g., green, may be required than from other colors, e.g., blue and red. In this embodiment, the subpixel that is to receive the green illumination bundle may have a larger rectangular aspect ratio than the other subpixels to allow for a greater portion of green illumination to be transmitted.

The lens 204 may be one of an array of lenses that are arranged to illuminate a corresponding array of pixels. In various embodiments, the lenses and the pixels may have a one-to-one, a one-to-plurality, or a plurality-to-one correspondence. In one embodiment, the lens array may be an array of lenticular lens elements. In this embodiment, each of the lenticular lens elements may illuminate a corresponding row of pixels.

Figure 4:
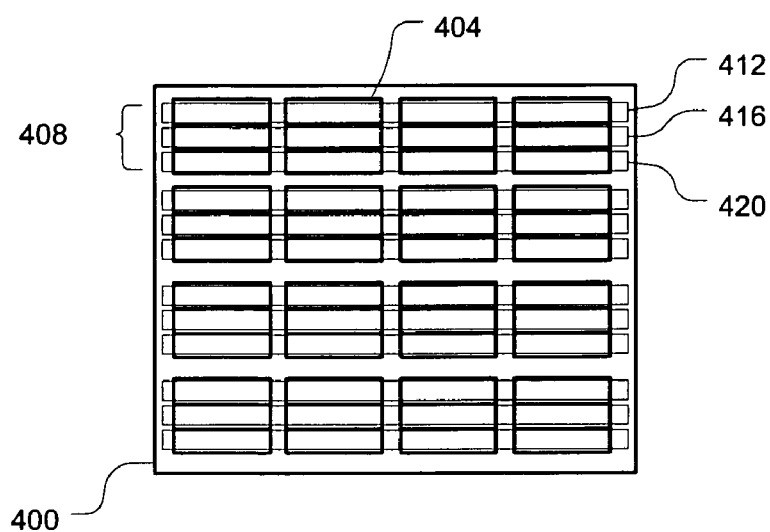
FIG. 4 illustrates illumination incident upon a number of pixels of a light valve display, in accordance with another embodiment of the present invention.

FIG. 4 illustrates a light valve display 400 being illuminated in accordance with an embodiment of the present invention. In this embodiment, the light valve display 400 may have an array of light valve pixels 404. Each light valve pixel 404 may have a number of selectively controlled subpixels, similar to the pixel 120 discussed above. In this embodiment, illumination bundles may be focused onto the display 400 through a lenticular lens array (not shown) with the resulting lenticular illumination 408 being striped across the face of the display 400. The lenticular illumination 408 may include distinct illumination bundles 412, 416, and 420 that are a result from the lenticular array being illuminated with ACS illumination, as discussed above. The distinct illumination bundles 412, 416, and 420 may provide complementary illumination to the subpixels of the pixels 404.

Figure 5:
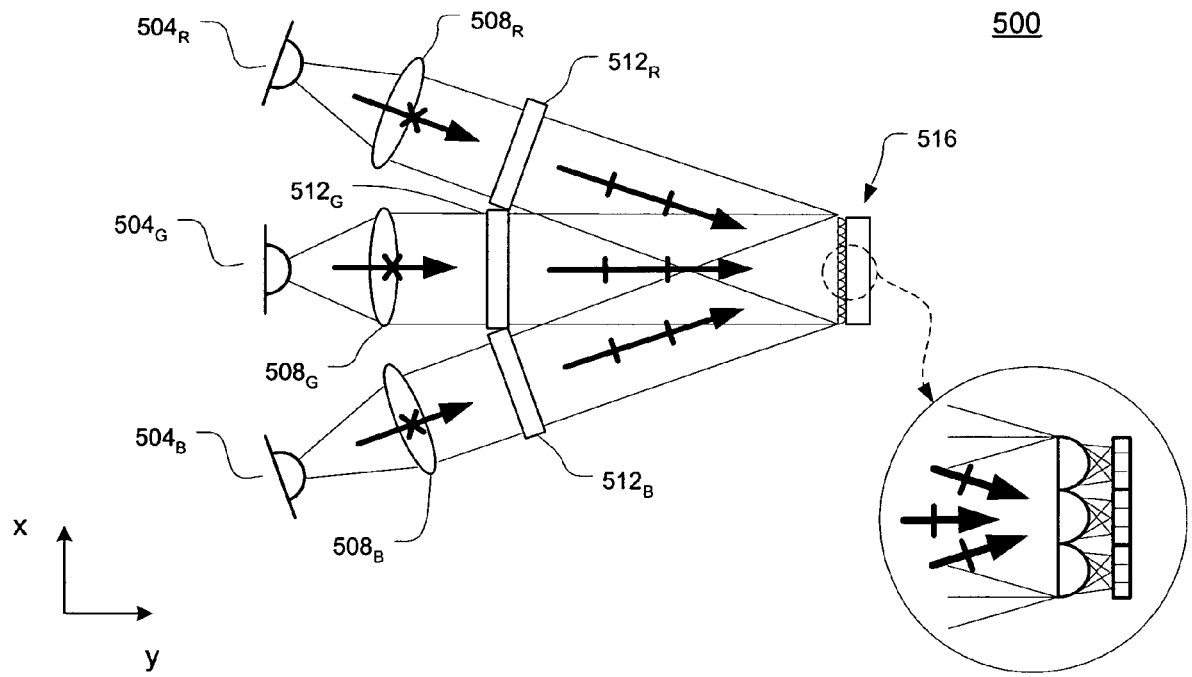
FIG. 5 illustrates a side view of an optical architecture with angular color separated illumination, in accordance with an embodiment of the present invention.

FIG. 5 illustrates a side view of an optical architecture 500 with ACS illumination, in accordance with an embodiment of the present invention. In this embodiment, an illumination module may include solid-state light sources $504_R$, $504_G$, and $504_B$, such as light-emitting diodes, to produce illumination bundles of primary colors, e.g., red, green, and blue, respectively. In one embodiment collimating optics $508_R$, $508_G$, and $508_B$ may placed in each of the illumination paths to receive diverging illumination bundles from the light sources $504_R$, $504_G$, and $504_B$ and transmit illumination bundles that contain substantially parallel light rays. In various embodiments, the collimating optics $508_R$, $508_G$, and $508_B$ may include one or more collimating lenses.

In one embodiment reflective polarizers $512_R$, $512_G$, and $512_B$ may be positioned in the various illumination paths to allow for light of one polarization state, e.g., P-polarization, to be transmitted while reflecting light of a substantially orthogonal polarization state, e.g., S-polarization. In other embodiments a converse arrangement and/or other polarization states may be used. The reflective polarizers $512_R$, $512_G$, and $512_B$ could include, but are not limited to, a wire-grid polarizer, a cholesteric polarizer, a polymer film stack, or a dielectric coating stack. The reflective polarizers $512_R$, $512_G$, and $512_B$ may each be a portion of a reflective polarizer or, alternatively, may be separate reflective polarizers.

The transmitted polarized light may then illuminate a microlensed display 516 across a range of illumination angles. The microlensed display 516 may include an array of lenses optically coupled to a light valve display, as discussed above with reference to earlier embodiments.

Figure 6:
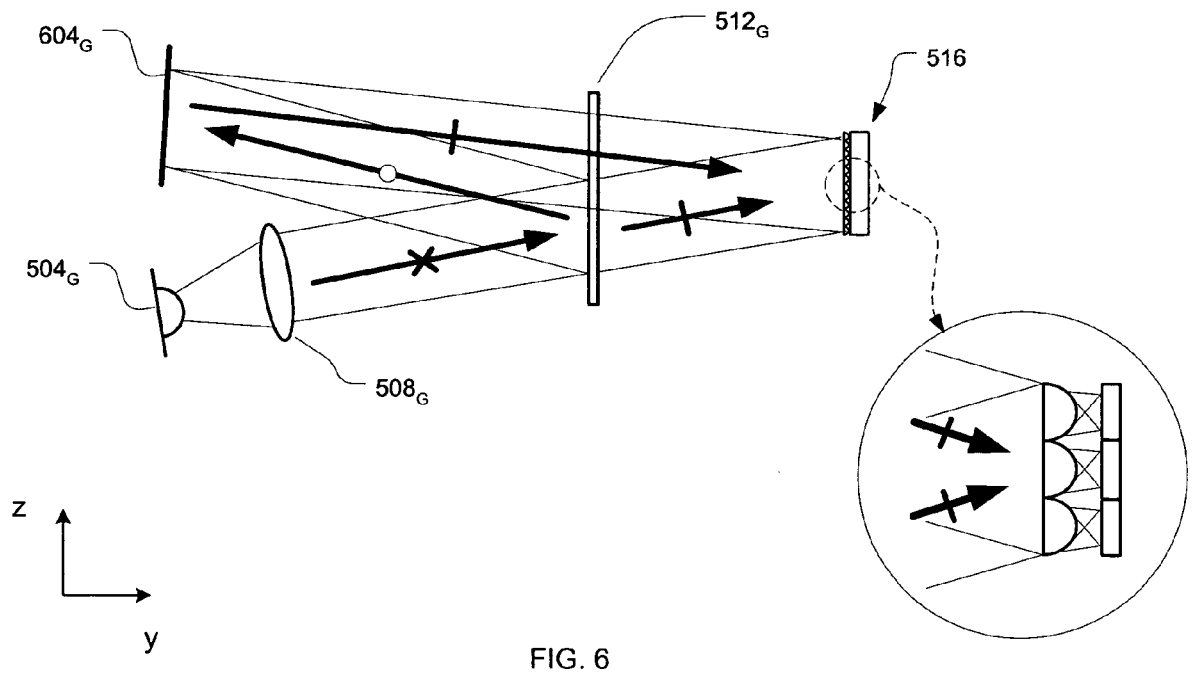
FIG. 6 illustrates a top view of an optical architecture with a polarization recycling assembly, in accordance with an embodiment of the present invention.

As described above, the reflective polarizers $512_R$, $512_G$, and $512_B$ may only allow P-polarized light to be transmitted so that the microlensed display 516 may properly manipulate the polarization of the light for selective transmission. FIG. 6 illustrates a top view of an embodiment of the optical architecture 500 that may provide for the recycling of the S-polarized light. In this embodiment, the light-emitting device $504_G$ may transmit an illumination bundle of randomly polarized light towards the reflective polarizer $512_G$. The P-polarized portion of the illumination bundle may be transmitted through the reflective polarizer $512_G$ and illuminate the microlensed display 516 along a primary optical path 604.

In this embodiment, S-polarized light may be reflected from the reflective polarizer $512_G$ towards a recycling assembly $604_G$. S-polarized light may be indicated in the figures by small circles in the light paths suggesting a polarization vector normal to the plane of the drawing sheet. The light-emitting device $504_G$ may be non-orthogonal to the reflective polarizer $512_G$ to facilitate an angled reflection.

The recycling assembly $604_G$, which may include a polarization rotation device and a reflecting device, may rotate the S-polarized illumination bundle to the P-polarization state and redirect it towards the reflective polarizer $512_G$. In various embodiments, the polarization rotation device may be quarter-wave plate or a quarter-wave film on the reflecting device. The recycled illumination bundle with the rotated polarization state may then be transmitted through the reflective polarizer $512_G$ and illuminate the microlensed display 516 along a recycling optical path 612.

Referring again to FIG. 5, in one embodiment the reflective polarizers 512 may be designed in a manner to reflect the S-polarized portions of the illumination bundles back towards the horizontal planes that the originating light sources are on. In this context, the horizontal plane may be a level plane normal to the plane of the drawing sheet. For example, the S-polarized portion of the illumination bundle originating from light-emitting device $504_G$ may be reflected towards a recycling assembly $604_G$ that is on the same horizontal plane as the light-emitting device $504_G$. This may, in turn, facilitate the presentation of the recycled illumination within the desired range of incident angles at the microlensed display 516.

Figure 7:
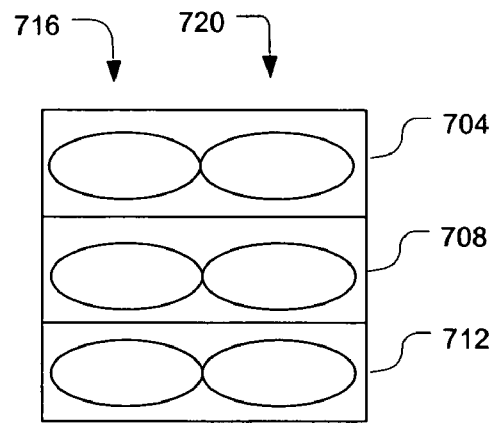
FIG. 7 illustrates the illumination incident upon subpixel apertures, in accordance with an embodiment of the present invention.

FIG. 7 illustrates a pixel 700 overlaid with illumination from the primary optical path 604 and the recycling optical path 612, in accordance with an embodiment of the present invention. In this embodiment, the pixel 700 may have subpixels 704, 708, and 712 similar to those of the pixel 120 discussed above. Each of the subpixels 704, 708, and 712 may include primary hot spots 716 resulting from the illumination bundles impinging upon the pixel 700 along the primary optical paths 604 and recycled hot spots 720 resulting from the illumination bundles along the recycling optical paths 612. Developing the optical architecture to present these illumination bundles in a side-by-side manner as shown may complement characteristics of subpixels such as the rectangular aspect ratio and/or angular transmission distribution.

Although the above embodiment illustrates an optical architecture producing two, substantially elliptical, illumination bundles incident upon the light valve pixel, other embodiments may not be so limited. For example, other embodiments may include three illumination bundles presented to the subpixel side-by-side-by-side, in order to take advantage of the geometrical transmissivity properties of the subpixel.

Figure 8:
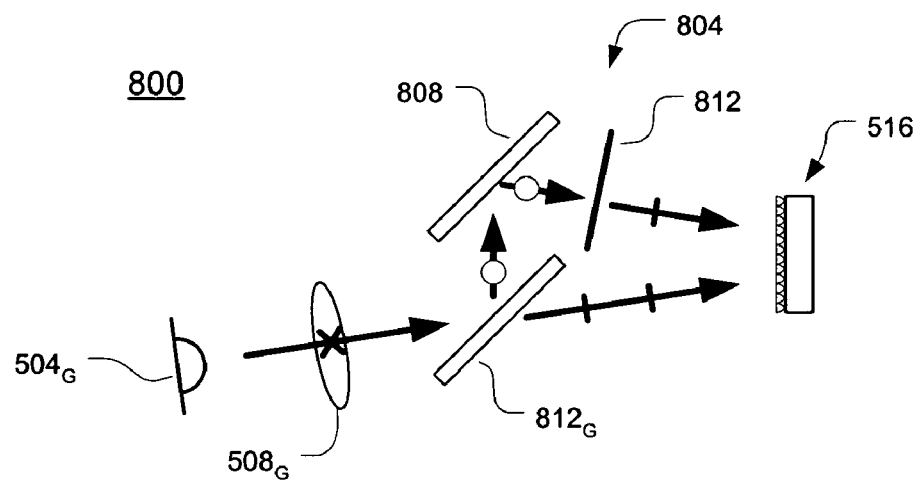
FIG. 8 illustrates a top view of an optical architecture with a polarization recycling assembly, in accordance with another embodiment of the present invention.

FIG. 8 illustrates an optical architecture 800 employing a recycling assembly 804 in accordance with another embodiment of the present invention. For simplicity, FIG. 8 illustrates only the polarization states along the optical paths of the optical architecture 800 and not the light rays. In this embodiment, illumination bundles may travel from the light-emitting device $504_G$, through the collimating lens $508_G$, and be incident upon the reflective polarizer $512_G$, in a manner similar to the embodiment depicted and discussed with reference to FIG. 6. However, in the present embodiment, the S-polarized portion may be reflected towards a reflective device 808. The reflective device 808 may redirect the S-polarized portion through a polarization rotation device 812, e.g., a half-wave plate or film. The polarization rotation device 812 may rotate the S-polarized light to the P-polarization state and transmit the light to the microlensed display 516.

Figure 9:
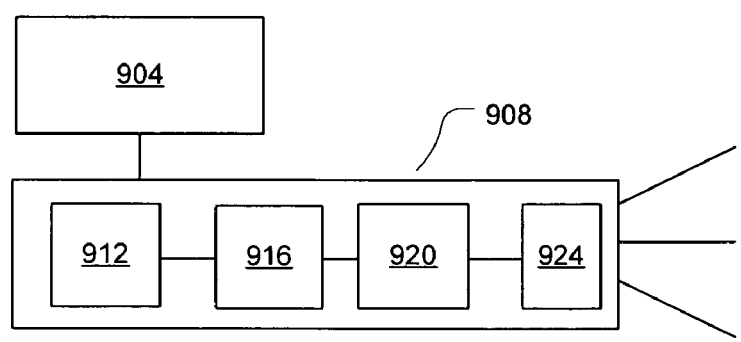
FIG. 9 is a simplified block diagram of a projection system in accordance with an embodiment of the present invention.

FIG. 9 is a simplified pictorial plan view of a system including a video unit 904 coupled to a projection device 908, in accordance with an embodiment of the present invention. In this embodiment the video unit 904 may transmit video signals to the projection device 908, which may include an illumination module 912 optically coupled to an optical assembly 916. The optical assembly 916 may provide light to a light modulator 920 that may in turn present image bearing light to projection optics 924. The components of the projection device 908 may cooperate with one another to jointly effectuate rendering of desired images, which may be image frames of a video, based on the transmitted video signals.

The video unit 904 may include a personal or laptop computer, digital versatile disk (DVD), set-top box (STB), video camera, video recorder, an integrated television tuner, or any other suitable device to transmit video signals to the projection device 908. In various embodiments, the system may be, for example, a projector or a projection television.

In one embodiment, the light modulator 920 may be, e.g., a liquid crystal light valve. Examples of these types of light valves include, but are not limited to reflective displays such as LCoS (Liquid Crystal on Silicon) as well as transmissive displays, such as thin film transistor (TFT), polysilicon (P—Si), and Silicon-on-Insulator (SOI). In one embodiment, the light modulator 920 may include a liquid crystal display that may include a number of individually controllable subpixels similar to the pixels 120 or 700 described in reference to earlier embodiments.

The optical assembly 916 may include an array of lenses optically coupled to the array of pixels of the light modulator 920. The optical assembly 916 may also include optics adapted to present the primary colored light to the lens array along three ranges of incident angles. The lens array may then focus the primary colors onto the subpixels being controlled with the corresponding primary colored image data based on the transmitted video signals.

Importantly, while embodiments of the present invention are described with reference to a video projector, the embodiments discussed herein are equally applicable to any type of illumination system for a polarization-based display, whether for projection or direct viewing, whether compact or not. For example, the techniques described herein are thought to be useful in connection with computer and data device displays, television and movie projectors, internet appliance viewers, and entertainment systems for video and game players.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
    an illumination module having a first solid-state light source adapted to produce a first illumination bundle and a second solid-state light source to produce a second illumination bundle; and
    an optical assembly adapted
        to receive the first and the second illumination bundles over a first range of incident angles and a second range of incident angles, respectively, the first range of incident angles being different from the second range of incident angles,
        to present a first portion of the first illumination bundle, and a first portion of the second illumination bundle, each having a first polarization state, to first and second subpixels, respectively,
        to rotate a second portion of the first illumination bundle and a second portion of the second illumination bundle, each having a second polarization state, to the first polarization state, and
        to present the second portions of the first and second illumination bundles to the first and second subpixels, respectively,
    wherein the optical assembly is adapted to present the first and second portions of the first illumination bundle in a manner to complement a rectangular aspect ratio of the first subpixel by causing the first portion to be incident upon a first section of the first subpixel and causing the second portion to be incident upon a second section of the first subpixel, the first section and the second section being at least partially non-overlapping sections distributed along a major axis of the first subpixel, and to present the first and second portions of the second illumination bundle in a manner complement a rectangular aspect ratio of the second subpixel.

2. The apparatus of claim 1, wherein the optical assembly is further adapted to present the first portions of the first and second illumination bundles to the first and second subpixels along first and second optical paths, respectively.

3. The apparatus of claim 2, wherein the optical assembly is further adapted to present the second portions of the first and second illumination bundles to the first and second subpixels along respective third and fourth optical paths that are different than the first and second optical paths.

4. The apparatus of claim 3, wherein the first optical path is incident upon the first section of the first subpixel, the second optical path is incident upon a first section of the second subpixel, the third optical path is incident upon the second section of the first subpixel, and the fourth optical path is incident upon a second section of the second subpixel that is different than the first section of the second subpixel.

5. The apparatus of claim 1, wherein the pixel comprises a liquid crystal pixel.

6. The apparatus of claim 1, wherein the pixel further comprises a third subpixel, and the optical assembly is further adapted
    to receive a third illumination bundle, and
    to present the third illumination bundle to the third subpixel in a manner to complement a rectangular aspect ratio of the third subpixel.

7. The apparatus of claim 6, wherein the first, second, and third illumination bundles comprise red, green, and blue illumination bundles, respectively.

8. The apparatus of claim 1, wherein the apparatus comprises an array of pixels, the pixel being one of the array of pixels, and the optical assembly comprises an array of lens optically coupled to the array of pixels, the lens being one of the array of lenses.

9. The apparatus of claim 8, wherein the array of lenses comprises a lenticular array.

* * * * *